United States Patent [19]

Vander Mey

[11] 4,096,571

[45] Jun. 20, 1978

[54] SYSTEM FOR RESOLVING MEMORY ACCESS CONFLICTS AMONG PROCESSORS AND MINIMIZING PROCESSOR WAITING TIMES FOR ACCESS TO MEMORY BY COMPARING WAITING TIMES AND BREAKING TIES BY AN ARBITRARY PRIORITY RANKING

[75] Inventor: James E. Vander Mey, Newtonville, Mass.

[73] Assignee: Codex Corporation, Newton, Mass.

[21] Appl. No.: 721,375

[22] Filed: Sep. 8, 1976

[51] Int. Cl.² .............................................. G06F 13/00
[52] U.S. Cl. .................................................... 364/200
[58] Field of Search ... 364/200 MS File, 900 MS File, 364/200

[56] References Cited

U.S. PATENT DOCUMENTS

| 3,242,467 | 3/1966 | Lamy | 364/200 |
|---|---|---|---|
| 3,323,109 | 5/1967 | Hecht et al. | 364/200 |
| 3,349,375 | 10/1967 | Seeber et al. | 364/200 |
| 3,374,465 | 3/1968 | Richmond et al. | 364/200 |
| 3,530,438 | 9/1970 | Mellen et al. | 364/200 |
| 3,544,973 | 12/1970 | Borck, Jr. et al. | 364/200 |
| 3,548,382 | 12/1970 | Lichty et al. | 364/200 |
| 3,641,505 | 2/1972 | Artz et al. | 364/200 |
| 3,735,357 | 5/1973 | Maholick et al. | 364/200 |
| 3,812,469 | 5/1974 | Hauck et al. | 364/200 |
| 3,905,023 | 9/1975 | Perpiglia | 364/200 |
| 3,916,383 | 10/1975 | Malcolm | 364/200 |
| 4,009,470 | 2/1977 | Danilenko et al. | 364/200 |

Primary Examiner—Melvin B. Chapnick

[57] ABSTRACT

A system for resolving conflicts among processors for access to a memory to which the processors are connected by a first bus includes a number of logic circuits, one for each processor. Each logic circuit receives a number of inputs to determine when access to the memory can be had for its processor. These inputs include a memory use request made by the processor, a memory availability signal communicated to all the logic circuits over a second bus, and the longest available processor waiting time, communicated to all the logic circuits over a third bus. Each logic circuit compares the longest processor waiting time with its own processor's waiting time, and will connect its processor to the memory when the following conditions coincide: a request for the memory by its processor, a memory availability signal, and one of the following: a longer waiting time for its processor than for any other processor or its processor's waiting time being equal to the longest other waiting time and its processor having a higher rank, different ranks being arbitrarily assigned to the processors to break ties. This system minimizes maximum processor waiting time because no processor can reach the memory twice before another that has in the meantime requested it reaches it once.

32 Claims, 8 Drawing Figures

SYSTEM FOR RESOLVING MEMORY ACCESS CONFLICTS AMONG PROCESSORS AND MINIMIZING PROCESSOR WAITING TIMES FOR ACCESS TO MEMORY BY COMPARING WAITING TIMES AND BREAKING TIES BY AN ARBITRARY PRIORITY RANKING

BACKGROUND OF THE INVENTION

This invention relates to a bus allocation system for a computer that has multiple processors and a common set of independent memory resources accessed by all of the processors over a common bus, to a data network processor unit which utilizes such a system to meet various needs of a data network, and to a modularized unit which enables ready expansion of the processor and memory capabilities, e.g., to tailor the unit to the level of traffic encountered at a particular data network node to which the unit is assigned.

SUMMARY OF THE INVENTION

The invention employs the combination of distributed contention logic, enabling use of identical logic on each contending module; parallel contention for fast priority resolution and bus allocation; contention based on availability of requested system resources; and contention based on priority that is a function of waiting time. The invention also employs memory modules which resolve among themselves the nature of the interleaving to be employed and the assignment of memory busy lines which communicate with the contention logic, all in a manner which requires no change to the contention logic.

Among the benefits achievable by use of the invention are no wasted bus cycles if any module is requesting any available resource; equal servicing with no lock-outs possible (FIFO); very fast contention resolution due to parallelism that does not require "daisy" chain selection; and use of simplified hardware mechanisms that are distributed on each processor and memory module, with no straps, etc. or centralized control required.

According to the invention, for use in a computer or data communications processor unit comprising multiple processors and a common set of independent memory resources accessed by all of the processors over a common bus, and controlled by a common clock, a logic circuitry is provided for allocating the processors to the individual memory resources which comprises a set of individual contention logic circuits, one associated with each processor, enabling all to operate in parallel time, to be combinatoric in nature and to require no sequential states of operation, or logic signals sequentially propagated through the set of logic circuits, and, in their joint functioning enabling one allocation per clock interval. The individual contention circuit for each processor features: input from each independent memory resource denoting its availability, interconnection with the other contention circuits to provide the longest length of time any other processor of the set has waited for access, priority interconnection with the other contention circuits, ranking these circuits according to a pre-determined priority rule to break ties between the circuits in case of equality of all other criteria, and connection with its own respective processor indicating need of the processor for access over the bus and the identity of the memory resource required by the processor. Each contention circuit is constructed to compare independently its length of time of waiting for the bus to that of the other circuits and is adapted to connect its own respective processor automatically to the bus when signals over the respective inputs and connections establish, that, for the respective processor: (a) it requires access to a memory resource, (b) and the memory resource it requires is available, (c) and it has waited as long or longer than any other processor, (d) and there is no processor with higher rank meeting conditions (a) through (c) (i.e., no processor with higher rank is "tied").

In preferred embodiments disabling inputs are provided for the set of contention circuits, the contention circuit of highest rank having no such effective input, and the circuits of decreasing rank having correspondingly increasing numbers of effective inputs, corresponding to the contention circuits of higher rank, each contention circuit being constructed to generate a discrete signal based upon satisfaction to the contention circuit of all of the criteria (a), (b) and (c) which is connected to a respective input of each contention circuit of lower rank. Preferably each contention logic circuit has a set of identical input lines corresponding to one less than the number of contention logic circuits in the set, those not needed being provided a constant dummy or false logic value, the contention circuit of highest rank having such value on all of its inputs and the contention logic circuits of descending rank having descendingly fewer of such inputs, the last circuit having none. Each contention logic circuit except that of lowest rank has an effective output which signals a true priority value when its logic circuit satisfies all criteria (a), (b) and (c). Each such output is connected to a respective input of each circuit of lower rank to disable the circuit.

Also, in preferred embodiments, the system includes means to provide a composite indication of the longest waiting time of all contention logic circuits on a wait bus to which all contention circuits are connected. Preferably each contention logic circuit places upon the wait bus its waiting time value. Each contention circuit has a comparator for comparing its waiting time value with the time value on the bus and means to disable the respective contention logic circuit when the comparison shows that the wait bus value is greater. Preferably too, each contention logic circuit includes a shift register started by a bus request signal from the processor, and means are provided: to maintain the shift register clear during intervals when the corresponding processor and contention circuit are not waiting, to accumulate in the shift register a set of consecutive ones corresponding to the number of intervals the processor and contention circuit have been waiting, and, during each cycle when it is contending, to apply the set of ones to corresponding inputs of the wait bus, whereby the highest order "one" applied to the wait bus represents the longest waiting time of any contention logic circuit in the system.

In preferred embodiments each stage of a waiting time shift register is connected to the respective wait bus line through a logic device implementing the wired OR function, whereby a logical true is forced on the respective line regardless of the value of any other input to the line, preferably each device being an open collector NAND gate having as inputs a stage of the shift register, and a signal indicating availability of the memory sought by the corresponding processor.

Preferred embodiments also employ a comparator comparing the stages of the shift register with corresponding lines of the wait bus, adapted to emit a true signal when and only when there is identity in the two sets of inputs. Preferably a logic device has as inputs the comparison signal, a signal indicative of availability of the memory sought by the corresponding processor and a set of signals from higher ranked contention circuits, representing no higher ranked circuit is tied, this logic device being adapted to emit a bus grant signal when all of the inputs are of true value, the bus grant signal preferably also being emitted to disable lower ranked contention circuits.

Also in preferred embodiments a memory busy bus is provided having one line associated with each memory resource, carrying a busy or not busy signal, means defining the address of the computer on an interleaved basis modulo n where n is a number equal to (or in some instances greater) than the number of independent memory resources, each of the contention circuits having a data selector whose inputs are the lines of the memory busy bus and the lowest significant lines of the address request of the respective processor, the data selector adapted to produce a positive indication when the modulo n value corresponds to a memory busy line having a "not busy" signal. Preferably the output of the selector is connected as an enable signal to a bus grant output device. In preferred embodiments a data network processor unit is provided incorporating the before-described contention logic circuitry and having an input/output bus connected to a multiplicity of real time data ports, and connectable via a selected processor to the address/data bus, the contention logic circuitry adapted to speed the processing of the data to enable real time operation without interruption.

In preferred embodiments the data communications processor unit includes blank spaces and appropriate connectors for receiving additional processor modules. Insertion of a processor establishes disabling inputs from any processor of higher rank and disabling outputs to any processor of lower rank, preferably accomplished by an identical set of connectors at each position with disabling inputs and dummy (constant false) inputs distributed as described above. The modules also provide a constant false signal to all of its priority inputs that would receive inputs from the absent processor. By these various connections, insertion or removal of a processor automatically enters or removes it from the bus contention system. (Insertion of the processor also automatically connects its contention logic to the memory busy bus and the wait bus.)

In the modularized data communications processor the memory busy bus preferably has a plurality of lines and interconnect connectors for engagement by inserted memory modules. Identical logic circuits can be provided on the memory modules themselves, according to the invention, by which, by merely sensing the absence or presence and the position of adjoining modules, each memory module allocates to itself the appropriate interleave format, address response and memory busy line for the contention logic. In a preferred embodiment, a single memory module carries two memory sections. If it senses no module present with which it can perform modulo 4 interleave, it shifts itself to a modulo 2 interleave mode, assigns even addresses to one and odd addresses to the other memory section, and assigns two of the four memory busy lines to each memory section, so that both show busy to the contention logic when the respective memory section is busy.

On the other hand if a module senses the presence of another available module, both modules automatically conform to a modulo 4 interleave mode, each assigning to its two memory sections two of the four possible interleave addresses depending whether it is left or right, and correspondingly assigns its two memory sections respectively to two memory busy lines. In this particular embodiment, modulo 4 operation may occur for the address ranges of each pair of neighboring modules, and a modulo 2 mode may occur for the possibly remaining module, over its address range.

These and other features and advantages of the invention will be understood from the following description of a preferred embodiment taken in conjunction with the drawings wherein:

BRIEF DESCRIPTION OF THE DRAWINGS

FIGS. 5 and 6 are block diagrams similar to FIG. 1 of data network processors incorporating the invention, while

DESCRIPTION OF THE PREFERRED EMBODIMENTS

Description of the Embodiment of FIGS. 1–4

Figure 1:
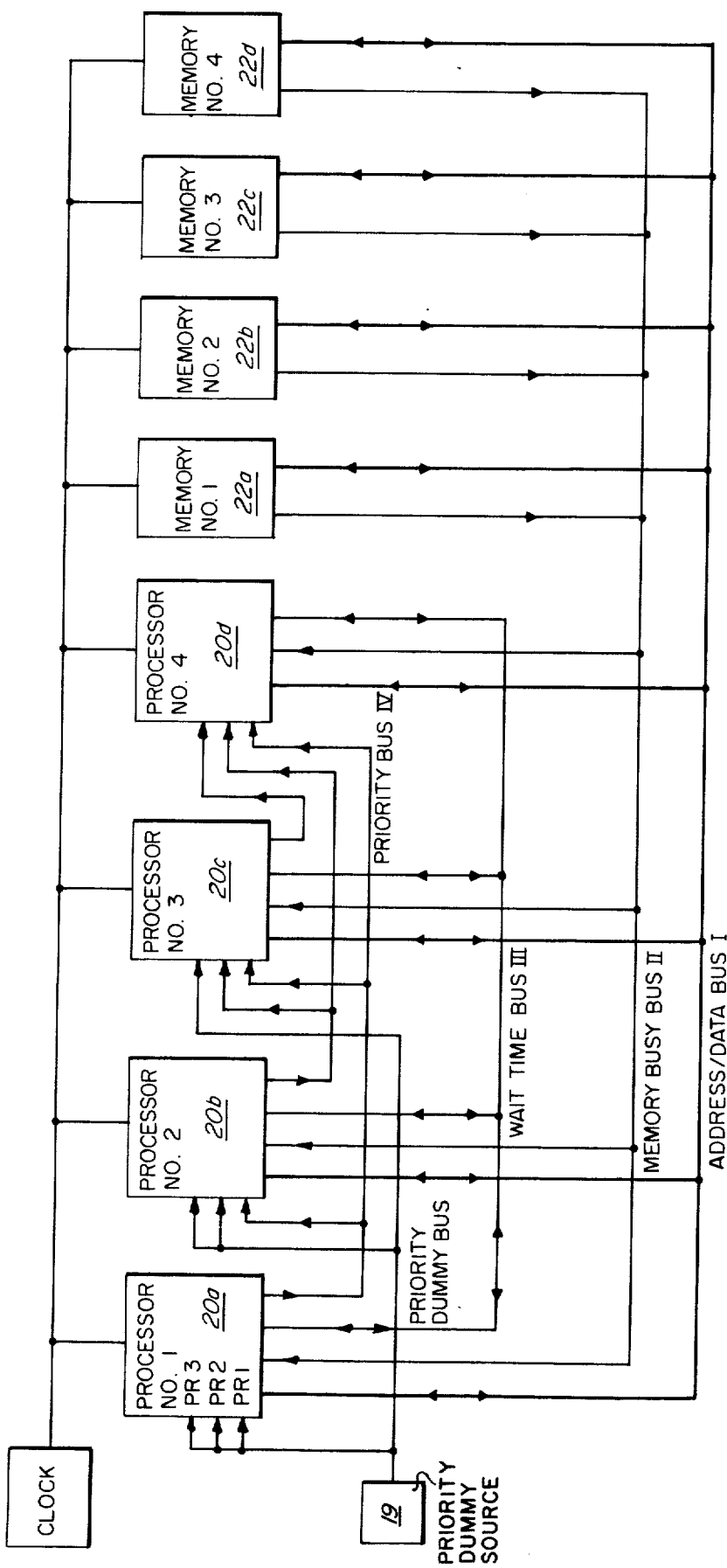
FIG. 1 is a block diagram of a multiprocessor, multimemory computer incorporating logic contention circuitry according to the invention.

FIG. 1 illustrates a computer system embodying the invention. The computer system has four processor modules 20 (a, b, c, d) and four memory modules 22(a,b,c,d). The processors share the memory modules on a time shared basis. Bidirectional data transfers between memories and processors are accomplished by using a group of common signal lines called the address-/data bus I, which supplies the addresses to the memory and transfers the data. The auxiliary busses II–IV shown are employed in the contention logic 30 (see FIG. 2). Each processor may independently attempt to access a given memory module. Since these access attempts are independent, conflicts for use of the time shared address/data bus and the memory modules will occur. It is the function of the contention logic associated with each processor to determine when it may use the bus to access a memory module.

The memory modules also operate independently. In this embodiment they are organized to respond to interleaved addresses; the interleaving here corresponds to the modulo 4 value of the address, chosen because the memory cycle time is typically longer than a memory access time and a memory module recently accessed may not be available when a processor wishes to access it.

The contention logic 30 on each processor must know the memory status of each independent section of memory. For this purpose a unidirectional memory busy bus II is provided for each independent memory, upon which the respective memory module indicates its busy status by asserting a "memory busy" signal when appropriate, for each master clock interval. There is one "memory busy" signal for each independent section of memory; hence a total of 4 lines comprise the "memory busy" bus for the embodiment of FIG. 1. This "memory" bus is routed to each processor, as shown.

To ensure fairness of service in cases of conflicting requests for the address/data bus, certain criteria are applied by the contention logic associated with each processor. The first criteria is that the memory module it wishes to access must be available before it can be granted bus access. This can be determined from the 'memory busy' bus. The next criteria is that no other processsor has waited for a longer period of time than this processor has. To evaluate this criteria each contention logic maintains a record of how long its processor has been waiting. Each contention logic compares the value on the "wait time" bus(bidirectional bus III, connecting all processors) with the value it has maintained for its processor.

A final criteria is necessary if more than one processor has met all the previously stated criteria, namely has been waiting for the same period of time and the memory modules they seek to address are available. In case of this kind of tie a strict priority ordering criteria is applied. In this embodiment this is achieved by a distributed priority function using the priority bus lines IV as shown in FIG. 1 in conjunction with priority circuitry in each contention logic. Simply stated this last criteria is met if all the priority inputs to the contention logic are logical false.

When the contention logic on any processor module has determined that all the criteria for bus access have been met, it will automatically assert a signal on a bus priority line to disable all lower priority processors. As shown in FIG. 1 this output line becomes one of the priority inputs to all lower-ranked processor module contention logics.

Figure 2:
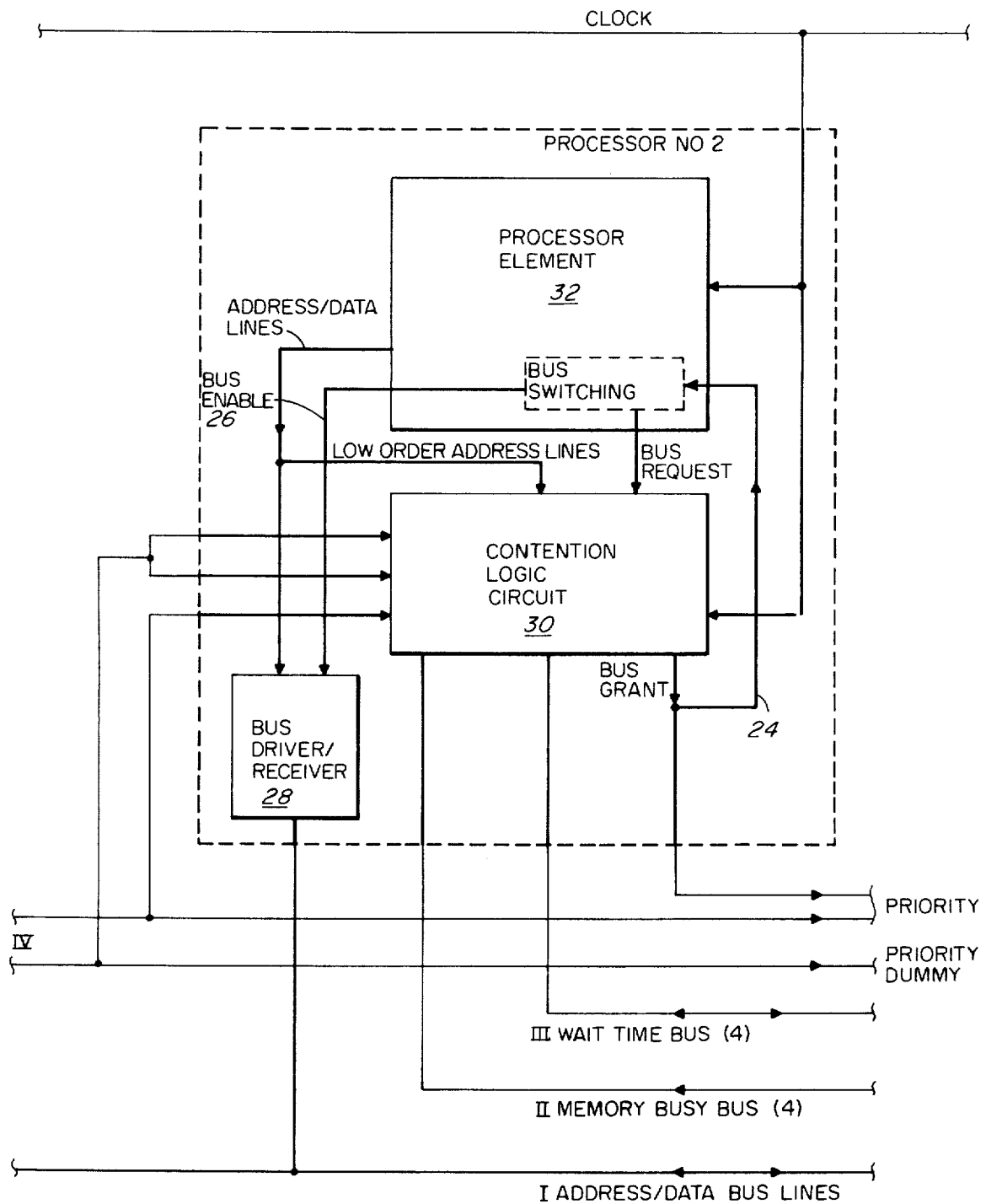
FIG. 2 is a block diagram of a single processor No. 2 of FIG. 1.

FIG. 2 illustrates a processor module with contention logic 30. The processing element 32 of the module determines when the memory access needs to be made. In this embodiment the processing element, when requiring access to the memory, asserts a "bus request" signal which is connected to the contention logic. The processinc element also supplies to the contention logic the address of the memory module being requested. In this embodiment the address input consists of the two lowest order address lines to specify which of the four possible interleaved memory modules is being accessed, according to the modulo 4 value of the address appearing in the address/data bus. The contention logic applies the contention algorithm as described above and supplies to the processing element the "bus grant" signal 24 at the appropriate time. The processor module will then be able to use the system bus on the next clock cycle to carry address and data information to the memory modules by emitting a bus enable signal 26 for enabling its bus drivers 28 and receivers to the respective busses as shown in FIG. 2.

Figure 3:
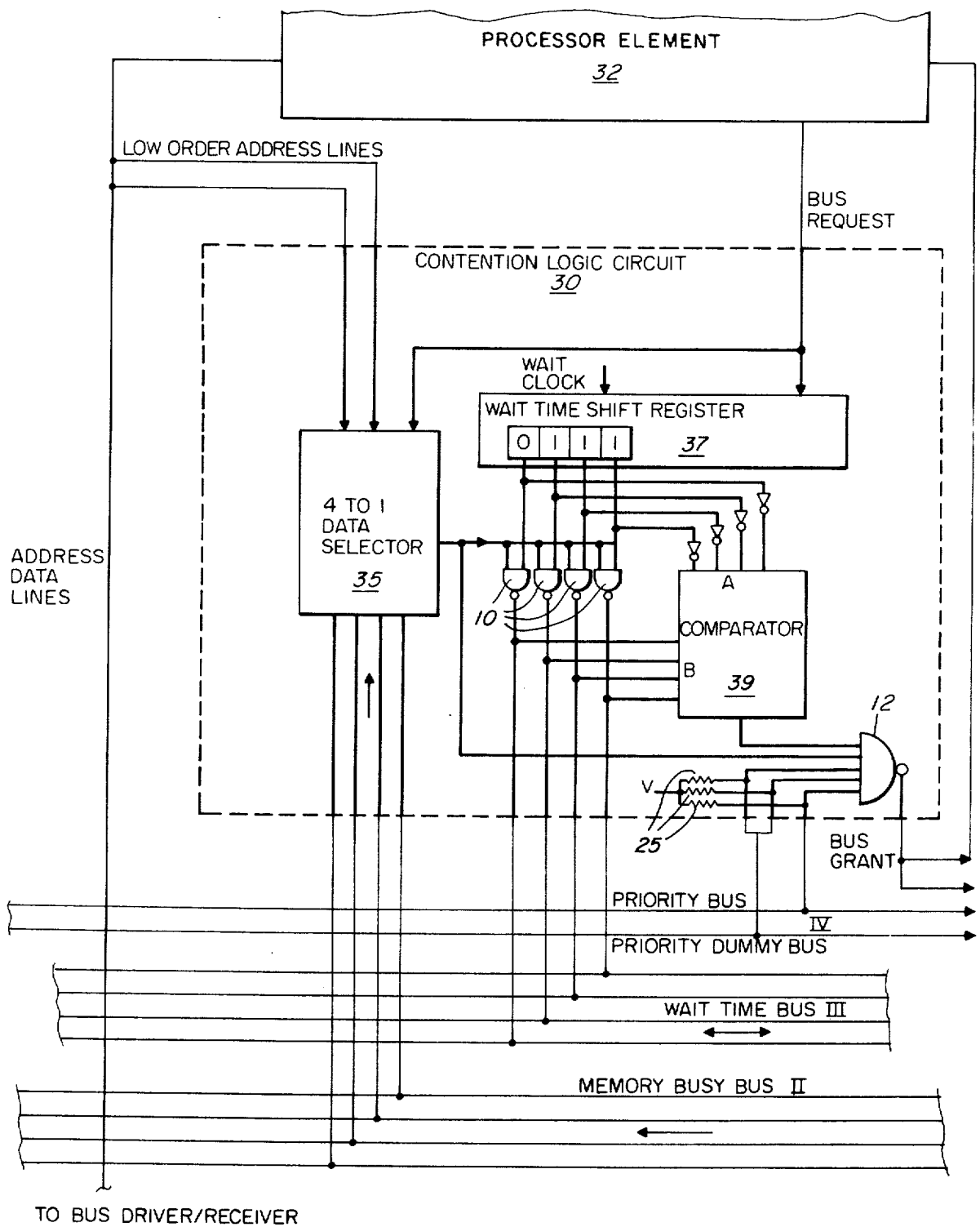
FIG. 3 is a schematic diagram of the logic contention circuit of the processor of FIG. 2.

FIG. 3 illustrates the elements of the contention logic 30. The "memory busy" bus from the memory modules is connected to the four-to-one data selector 35. The two low order address lines from the processing element are used as inputs to the data selector to select the appropriate "memory busy" line. The "bus request" line from the processing element is also connected to the data selector as the output enable condition. The output from the data selector indicating the state of the selected "memory busy" line is connected to various elements of the contention logic, as shown.

Operation of the Preferred Embodiment of FIGS. 1–4

The entire system illustrated in FIG. 1 operates from a master system clock. This implies that all state changes throughout the system are synchronous with respect to a particular instant in time. Thus all processor requests for memory are synchronized to some particular point in time.

The contention logic circuits associated with each processor operate such that after every state transition each will resolve any outstanding request for the memory and the bus before the next clock transition. The result will be that one and only one processor will grant itself access to the address/data bus on the next clock cycle, if in fact any processor is requesting a memory unit that is available.

Since all state changes occur on a clock edge, all signals will stabilize after some propagation delay time before the next clock edge. This applies to all signals being received by the contention logic and of course therefore all signals output by the contention logic.

Figure 4:
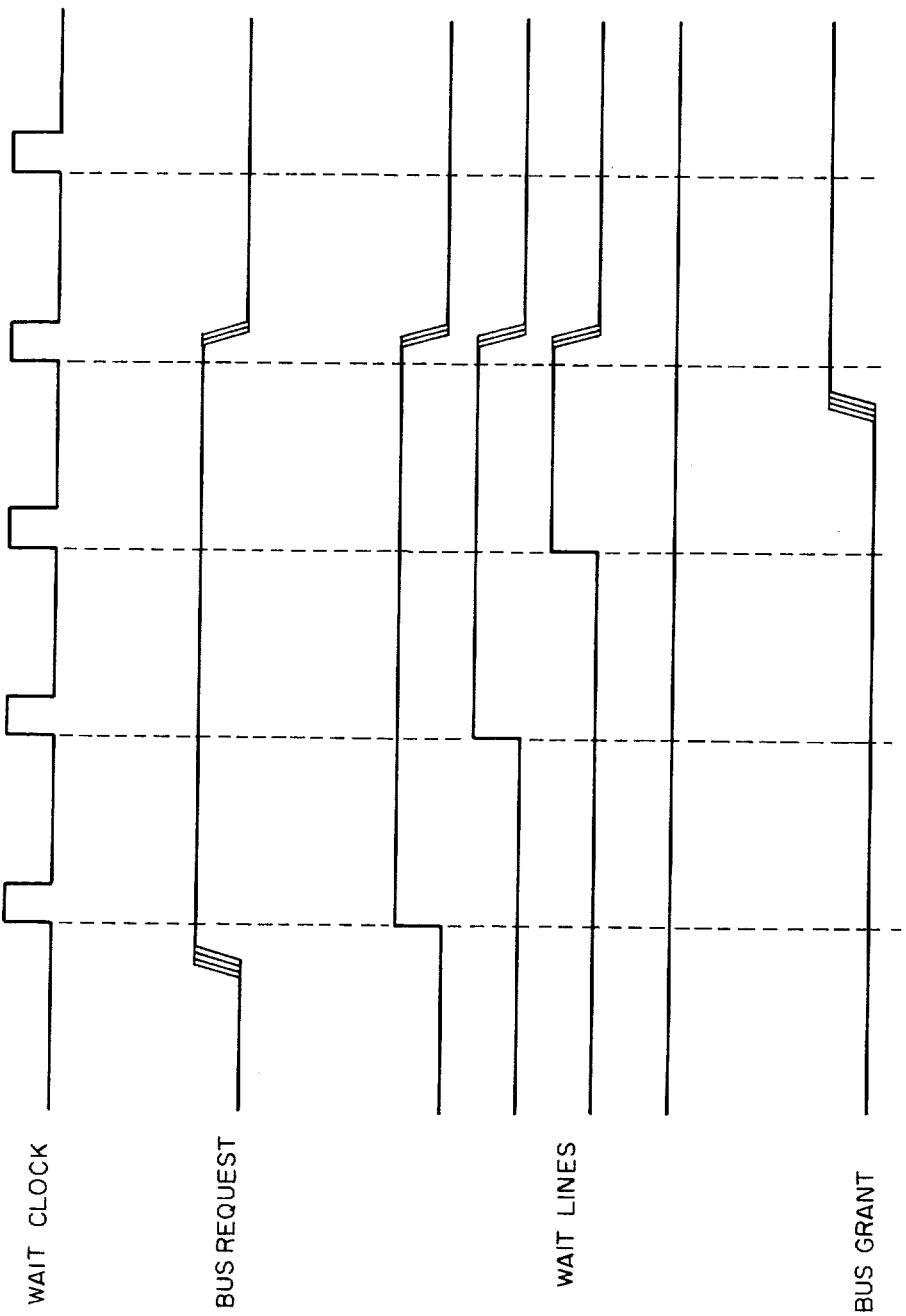
FIG. 4 traces certain events over time on the circuit of FIG. 3.

A processor requiring a memory access will supply the 'bus request' signal to its contention logic circuit. This signal will enable the data selector output. The output of this data selector will be one of the 'memory busy' lines from the memory as shown in FIG. 3. The particular 'memory busy' line will be selected by the two low order address lines supplied by the processing element. The sense of the 'memory busy' lines on the system bus is inverted. Thus if the memory being selected is not busy, the output of the data selector will be logical true or high. This output signal will be applied to the four NAND gates 10, driving the 'wait' lines. This will result in the value of the 'wait time' shift register 37 being supplied to the wait bus in inverted form. Initially the "wait time" shift register will be clear. This is due to the "clear" input being asserted when there is no "bus request" signal from the processor element. If, however, the bus request signal has been asserted for some time due to contention delay, the 'wait time' shift register will be clocked and a value of "one" will be shifted into the least significant bit. If the bus request is still present when the next "wait clock" signal occurs another bit will be shifted into the "wait time" shift register. This process continues with each 'wait clock' signal until the bus is granted and the "bus request" signal is removed thereby clearing the "wait time" shift register. FIG. 4 illustrates an example of the change in states of the "wait time" shift register. In this example the "bus request" signal was present from the processor for three "wait clock" periods before the bus grant occurred and the "bus request" signal was removed.

Since each processor module's contention logic may be asserting wait signals at the same time, the value of the wait lines on the bus reflects that of the processor which has been waiting the longest. This is due to the fact that the NAND gates are open collector drivers which result in the "wired OR" function. To determine if this processor has been waiting as long as or longer than any other processor, the contention logic merely has to compare the contents of its "wait time" shift register with the value present on the bus. The values of the "wait time" shift register are entered into the comparator 39 as the A inputs. The value of the wait line on the bus are the B inputs to the comparator. If the "equal" output of the comparator is high, then no processor has been waiting longer than this processor.

If the processor element is requesting the bus and the selected memory is not busy, the first input to the priority NAND gate will thus be high. Furthermore, if this processor has been waiting at least as long as any other processor the 'equal' output of the comparator which is the second input to the priority NAND gate 12 will also be high. Note that these inputs will all become stable sometime after the clock edge but definitely before the next clock edge (of course, taking care to ensure that the propagation delay time through the various components and over the bus lines is small compared to the clock interval). If the three priority input lines are also high, indicating a logical false condition, then the output of the priority NAND gate 12 will be low indicating a "bus grant" to the processor. This "bus grant" line will also become one the the priority lines to the other processors as determined by the bus interconnect scheme of the priority lines shown in FIG. 1, in which the dummy values supplied by priority dummy source 19 are of the value corresponding to "no higher rank processor tied." It can be seen from FIG. 1 and FIG. 3 that in case of a contention tie, the highest rank processor, which in this embodiment is the lowest number processor among those tied, and no other will have a "bus grant" signal present at its processing element on the next clock edge.

It is important to note that the transition of the "memory busy", "wait", and "priority" signals during the interval between clocks is unimportant. What is important is only that they be stable by the time of the next clock edge. The only factor affecting this settling time is the propogation delay time to the various components.

The wait time bus has a number of lines for indicating various durations of waiting. Each "wait" line is driven by an open collector NAND gate 10 as shown in FIG. 3. One set of inputs to these NAND gates is connected to respective stages of 'wait time' shift register 37. The other set of inputs is connected in common to the output of the data selector. The "wait time" shift register has a "clear" input which is connected to the "bus request" line from the processor element. The "wait clock" for the "wait time" shift register is simply the master clock divided by a divide down counter, for instance each wait clock interval may represent 6 intervals of the master clock. The outputs of the 'wait time' shift register are also connected thru inverters to the A inputs of a comparator and the B inputs of that same comparator are connected to the 'wait' lines on the bus. The 'equal' indication output of the comparator is connected to the input of a priority NAND gate 12. The other inputs of this gate are the output of the four to one data selector, and the three priority lines from the bus. The output of this NAND gate 12 is the inverted state of the "bus grant" signal which is connected to the processing element and one of the bus priority lines.

All of the components of this contention logic are readily available components supplied by numerous manufacturers. One such manufacturer is Texas Instruments and these components may be found in "The TTL Data Book", Texas Instruments, 1973. Specifically, the following elements may be employed:

|  |  | TI # |
|---|---|---|
| 4 to 1 data selector | SN | 74153 |
| Comparator | SN | 7485 |
| Wait time shift register | SN | 74195 |
| NAND GATE 10 | SN | 7438 |
| NAND GATE 12 | SN | 7430 |

ALTERNATIVE EMBODIMENTS

It is easily seen by one skilled in the art that various alternatives and extensions to this embodiment are easily possible. For example, for an additional processor one need only add one more "priority" line on the bus and expand the priority NAND gate in each contention logic section by one input. To add more memory modules one needs simply add one more "memory busy" line for each independent section of memory, or combine the additional memories into groups such that they share busy lines, and make appropriate changes in the address protocol. To change the wait time, for example, one can simply change the "wait clock" period or add additional stages to the wait time shift register. It should also be obvious that one can skew the actual bus access time with respect to the bus grant time. For example, the address time may immediately follow the bus grant, but the data transfer may be at some later time, fixed in relation to the bus grant. This in no way changes the basic contention mechanism. Thus it is seen that a truly modular architecture has been provided, which requires virtually no change in logic when scaling from a single processor and memory to multiples of either or both.

Figure 5:
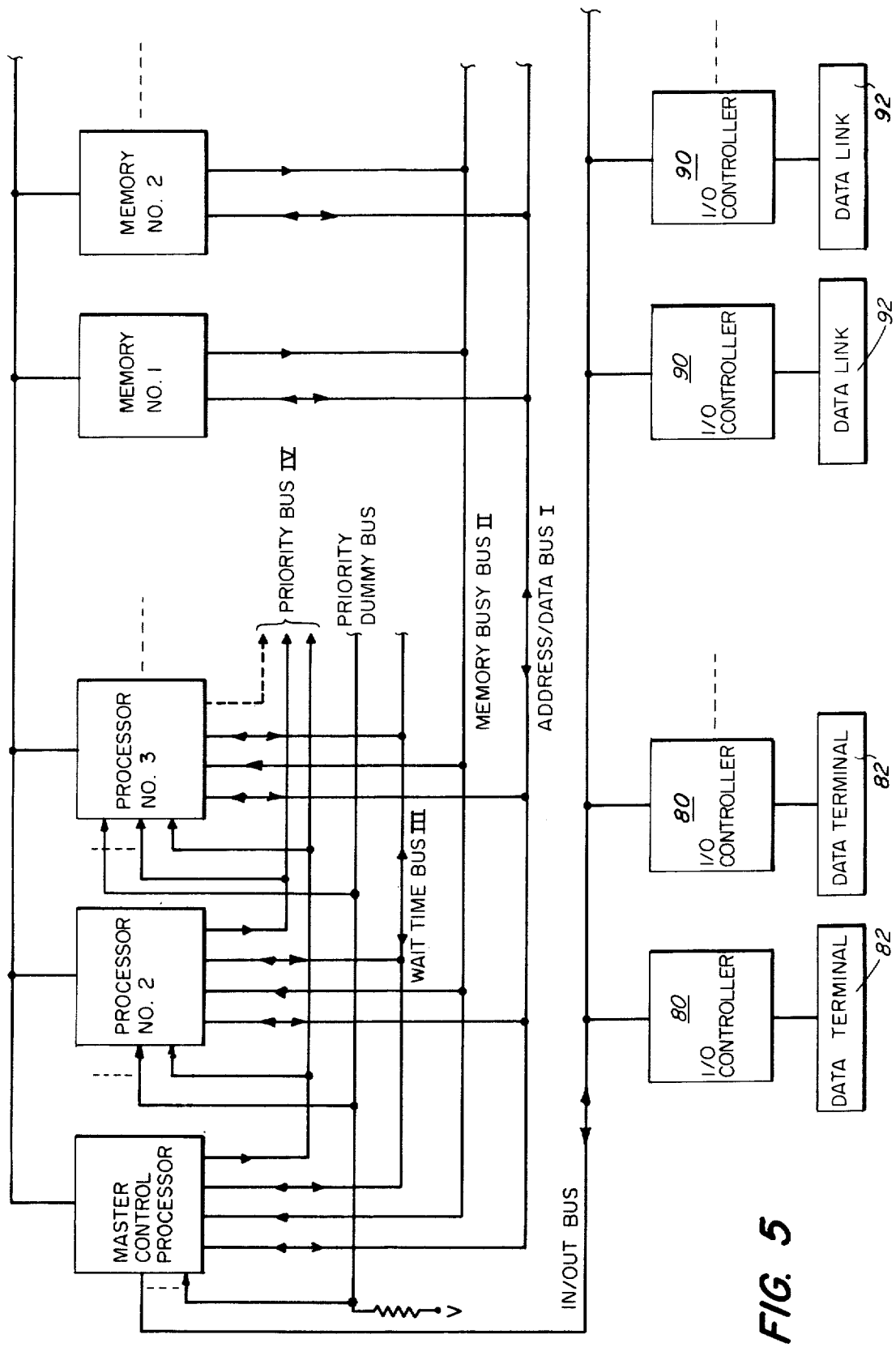

Multiple-Microprocessor Data Network Embodiment (FIG. 5)

Data communications requirements typically vary widely. Even within the same network, there may be small nodes supporting only a few ports over a single communications link, as well as large backbone nodes passing traffic from many sources over multiple high-speed links. Trunk speeds range commonly from 2400 to 9600 bps, but in larger networks 19.2 Kbps and even 50/56 Kbps links may be justifiable. A major goal for the embodiment now to be described is to meet these varying requirements within a common, modular architecture. It is also the object to provide a multinode network that avoids a constricting capacity ceiling through use of a selectable number of microprocessors.

Typical multiprocessor architectures dedicate each processor to a certain subset of the tasks that have to be performed. The present invention enables effective implementation of a parallel, or symmetric multiprocessor architecture in which every processor is equally capable of picking up any task. The advantage of this approach is that any number of processors from 1 to the maximum physical limit can be used, thus yielding a modular machine whose power can be tailored to nodal requirements. With a single processor, the machine to be described is well adapted to typical small-node applications, while an 8-processor machine has approximately the processing power (for communications applications) of two mid-size minicomputers and can support of the order of 50/56 Kbps of full duplex throughput.

Another advantage of the symmetric multiprocessor design made possible by the invention is reliability, since removal of a failed processor allows the system to continue to operate, with reduced processing power.

In the present embodiment of FIG. 5 the high bus transfer rates desired are achieved by use of a high-speed, synchronized mainframe bus (allocated by the contention system already described) to link the processors with each other, with the program and data memories, and with the microprogrammed master controller. In terms of bus contention the master controller processor is treated identically to any other processor. Communications with the external data communication ports, on the other hand, is a naturally asynchronous and lower speed process taking place over greater physical distances, so a separate I/O bus with its own asynchronous protocol is employed.

FIG. 5 shows the resulting relationship between the major functional elements of the processor. The mainframe address/data bus supports, e.g., up to 8 microprocessor modules and a mixture of up to 8 RAM and ROM memory modules, with any processor able to access any memory. The I/O (IN/OUT) bus connects the mainframe to the individual external data source/sinks, or "ports." A variety of port types may be provided, for instance, data terminal ports 82 and data link ports 92, each connected to the I/O bus through a corresponding I/O controller, 80 and 90, respectively. In one specific embodiment up to 32 ports can be accommodated in a port nest, which is a physically separate subassembly that contains a nest interface card to interface to and redrive the I/O bus; and up to 8 port nests can be attached to one mainframe. The master controller module controls the I/O bus, interfaces it to the mainframe address/data bus, and performs numerous other functions common to the communications problem. An optional module, not shown, can interface an optional operator's console to the master controller and can support other optional features.

Processor Modules

Each processor module contains a single microprocessor and auxiliary circuitry. The microprocessor is a Motorola 6800, which is an 8-bit processor capable of operating at a 1 MHz cycle rate, chosen for processing speed and coding requirements when applied to communications tasks. External augmentation is employed to enable it to function for this purpose in a multiprocessing environment. An external index register and an external interrupt control register are added, as well as the circuits used in implementing the bus contention, and auxiliary circuits for the task dispatching algorithms which are beyond the scope of this disclosure.

Memory System

The design of the memory system is critical to getting effective utilization of all the processors. A single global memory is attractive on grounds of simplicity and of facilitating interprocessor communication. However, there must not be excessive interference between processor accesses of the memory, or processing speed will be unduly degraded.

A typical instruction mix for the data network unit requires a memory access on the average of 2 out of every 3 processor cycles. At a 1 MHz processor cycle time, 8 processors therefore require of the order of 5-6 million memory accesses per second. A system bus with a 6 MHz transfer rate is therefore provided. The bus has separate 16-bit address and 8-bit data lines and is pipelined, in the sense that an address presented on one cycle will result in data being returned on a subsequent cycle. For fast memories (access times less than 200 nsec) the data returns on the next cycle, while for slower memories (200-367 nsec access) it returns two cycles later, and for memories of still different speed, different return phasing may be produced under machine control. The bus operates from the same clock as the memories and processors so that the entire mainframe system is synchronized.

The bus will accommodate various types of memory, having various speeds, for instance two types of read/write random-access memory (RAM) modules, accomodating 8K and 16K bytes, respectively. The access time of these memories is in the 200-367 nsec range, and their cycle time is 500 nsec. Each module is partitioned into two banks which can be accessed independently in the interleaved fashion that has been discussed above. In addition, two adjacent RAM modules on the bus jointly do a four-way interleave—i.e., four cycles can be in progress at once. This gives an effective cycle time of 125 nsec, which is substantially faster than the bus cycle time.

Different types of read-only memory (ROM) modules are also employed, some being sufficiently fast that they need not use the busy bus. One type accomodates up to 24K bytes of a type of read-only memory which is erasable with ultraviolet light and thus can be reprogrammed (Intel 2708). This type of ROM is used for software development. A second module accommodates up to 16K bytes of conventional fusible-link programmable ROM (PROM), and is used for program memory in standard systems. Software can be executed directly out of PROM thus avoiding duplicative RAM modules.

As has been described in connection with the previous embodiment, potential conflicts arise in the data network hardware being described when two processors attempt to access the memory on the same cycle, or when a memory access is attempted on a memory section that is already busy. These conflicts are mediated according to the invention so that on each bus cycle access is granted to that processor, of those that are contending for any non-busy resource, that has been waiting the longest, with ties arbitrarily resolved. This shows no favoritism between processors and guarantees that the bus will be used whenever there is any serviceable request for it. Since the processor cycle time is synchronized to the bus cycle time (1 processor cycle-6 bus cycles), this also tends to reduce processor contention, since if two processors conflict on one bus cycle, they will be serviced on two successive bus cycles, and thereafter will be out of phase with one another. In a system with six or fewer processors, contention thus virtually disappears after the contention logic has functioned for a short while.

Servicing of Interrupts

This real-time data network system employs an interrupt system to respond to asynchronously occurring external events. An interrupt typically causes a processor to store the state of its current task and initiate the task that will appropriately respond to the interrupt. At a later time the original task is restarted after the processor status is restored. This context switching can be a major drain on processing capacity. In the present case the processors are designed to be character-oriented, where every character, typically an 8-bit byte, is individually handled. It would be intolerable to have a context switch for each received character.

Fortunately, communications processing tends to consist of small, relatively independent tasks. A character is entered, processed, and dispatched, largely independently of similar tasks executed on other characters from different sources. (This property is a major reason why a parallel multiprocessor architecture has been found feasible and attractive for communications applications).

Another characteristic of communications processing is that characters on any one channel tend to arrive and leave at regular rates, or in any case at a rate limited to some maximum rate by the bandwidth of the communications medium to which it is attached. This means that there is a certain minimum interval or "overrun time" between external service requests from any given device.

These considerations motivate the following task dispatching procedure by the master control processor. An external service request does not immediately result in a processor interrupt; rather, the request is queued with a certain priority for a time close to but short of its known overrun time. When a processor completes one task, it services the oldest highest priority pending request. Because most tasks are short, it is likely that a processor will complete a previously initiated task and begin the requested task without any interrupts or context-switching. Only if a request is not serviced for a time approaching its overrun time does it actually cause an interrupt of a lower-priority task. This procedure drastically reduces the frequency of actual interrupts.

There are eight priority levels for pending service requests. Each different type of external service request is serviced at a different priority level and is vectored to a routine specific to that level. When a task is suspended (by an interrupt) or created (by a fork), it creates a pending internal service request which is queued at the level at which it was executing. When an internal queued request is serviced, the associated task is automatically restarted, perhaps on a different processor from the one on which it was originally executing. Internal service requests have priority over external service requests at the same level.

Master Controller

The master controller controls all I/O transfers and implements the task dispatching procedure described above.

The master controller is implemented as a microprogrammed minicomputer, using the Intel 3000 series of bipolar 2-bit slices. It operates at the 6 MHz cycle time of the system bus, and utilizes 8-bit data words and 32-bit microinstructions.

The master controller executes a variety of "superinstructions" which augment the main instruction set and offload considerable processing overhead from the microprocessors. These superinstructions used for such purposes as task dispatching, context switching, I/O transfers, and the implementation of lock bytes, allow multiple processors to access shared resources without conflict.

Ports

The processor conmunicates with the outside world via a number of port types, which communicate with the mainframe over the I/O bus which is separate from the mainframe address/data bus.

The principal port type is the Terminal Port (TP). The TP is a programmable port which can support either asynchronous start-stop protocols or character-oriented synchronous protocols (e.g., BSC). It performs character assembly/disassembly and buffering, character parity checking, insertion/deletion of idle fill, control of EIA interface signals, and other similar functions. The principal component is the Western Digital ASTRO, an LSI circuit that requires little augmentation for this application.

The second port type is the Network Port (NP), which supports intranetwork links. The NP is specifically designed to support the intranetwork protocol which was developed for this family of processors. The protocol is similar in some respect to HDLC/ADCCP/SDLC protocols, and the NP performs the associated flag generation/detection, bit stuffing/pulling, and block cyclic check code generation/checking. It also supports the variable-length codewords that represent characters within frames. Finally, it buffers up to 256 bits of incoming and outgoing data and controls the EIA interface to a synchronous data link. The NP is implemented primarily with MSI circuitry, with LSI FIFO memories and parity generator/detectors.

A third port type is the transparent synchronous port (TSP), which merely time-division multiplexes external synchronous data streams at ½ or ¼ the trunk rate with NP intranetwork data, thus allowing piggybacking of such data within the network.

The I/O bus is an asynchronous bus whose protocol resembles the ASTRO bus protocol and which is controlled by the master controller. It utilizes an 8-line bidirectional data bus for both data and control information.

Figure 6:
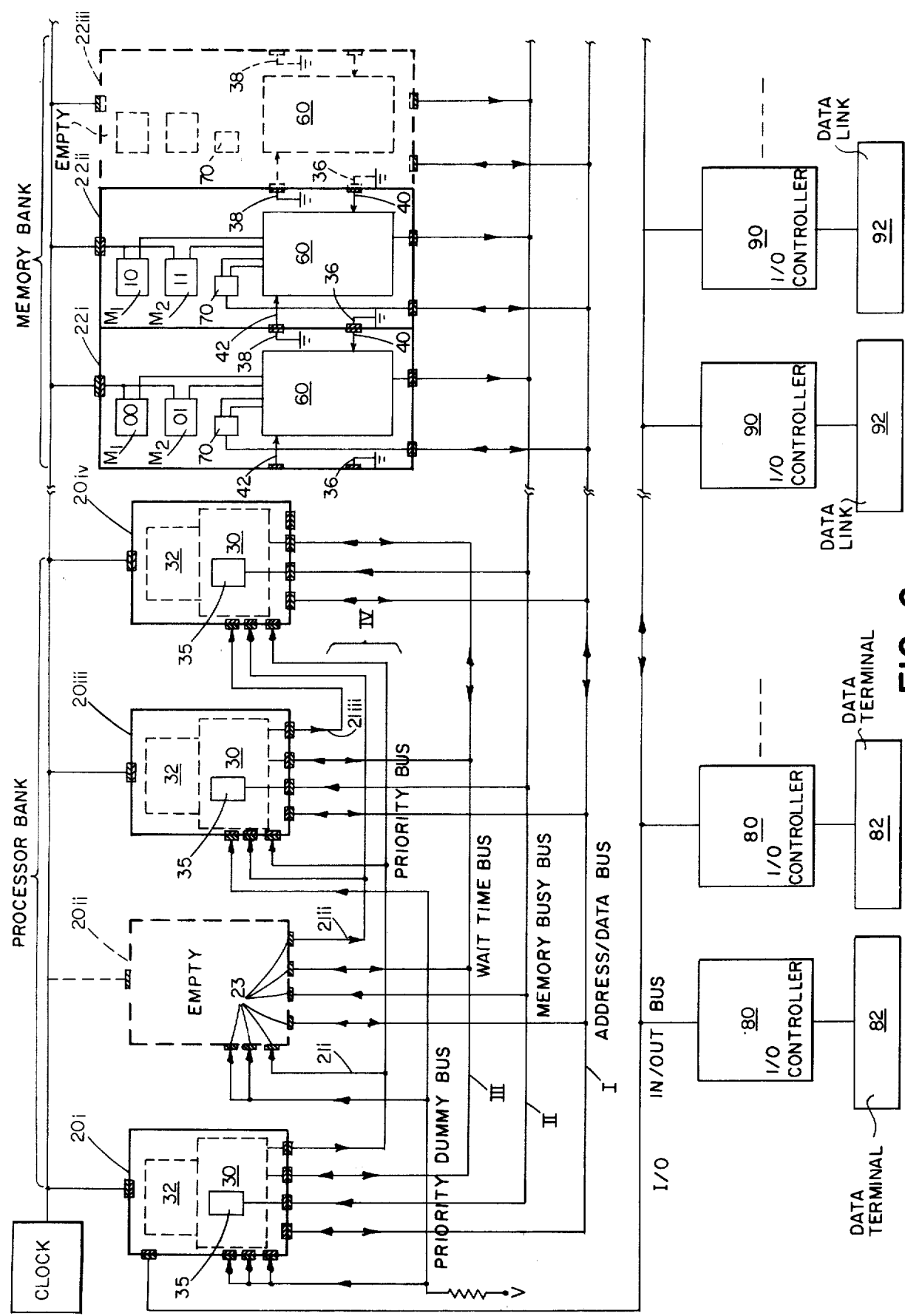

FIG. 6 illustrates a modularized data network processor having operational characteristics along the lines just described. Insertion or removal of a processor or memory module automatically enters or removes it from the bus contention process. For this purpose the processor bank is provided with connectors 23 for the various lines, to define four processor positions, $20_{i-iv}$. Three are shown filled, with the blank at position $20_{ii}$. The hard wiring for bus contention is constructed to accommodate the maximum number, 4, and thus with the position $20_{ii}$ blank, inhibit output $21_i$ from module $20_i$ terminates at an open connector 23. As can be seen, this has no effect on the contention logic for the installed processors. The inputs $21_{ii}$ to the lower ranked processors, similarly now connected to open connectors 23, are constructed to introduce constant highs to indicate the logical false condition to the respective contention logic circuits (see in FIG. 3 the voltage source V and the resistors 25, these of values chosen to be overridden when real signals appear on the priority lines).

The memory bank is similarly wired with connectors, in this case to define up to eight positions (22i, 22ii, 22iii, and so on) for accepting memory modules. By means of module outputs 36,38 and inputs 40,42 at the left and right sides of each module, any module can detect the presence and position of adjoining modules. On this basis the module can decide for itself, by predetermined rule, the proper allocation of the memory busy lines, the interleave mode of operation (whether modulo 2 or modulo 4) and address assignments between the memory segments of the module, employing memory address decoder 70. Referring to the schematic and table of FIG. 7, with two modules present in the first two positions, determined, e.g., by permanent wired module numbers as shown, the modules decide upon a modulo 4 interleave. In this case the last two address lines 14 and 15 locate the module pair, address line 1 selects between the members of the pair, and address line 0 selects between the two memory sections, $M_1$ and $M_2$, of each module. The memory busy lines are assigned in accordance with the modulo 4 value of the assignments within the pair.

With only one module present, (or three, with the first two already paired for modulo 4 operation) the module decides for itself to interleave modulo 2 with the following busy line assignments:

$M_1$/00 and 01 $M_2$/10 and 11

In the case of three modules being present a complex relationship occurs. The first four memory sections provided by the first and second modules proceed with a modulo 4 interleave as if the third module were not present. The third module, having detected its position accepts addresses higher than the capacity of the modulo 4 system and allocates these higher order bytes between its two memory sections on a modulo 2 interleave basis. The even and odd memory sections of this modulo are then coupled to the memory busy lines with memory sections in the modulo 4 set, and operate dependently with them as a single independent memory resource for bus contention purposes.

Figure 7:
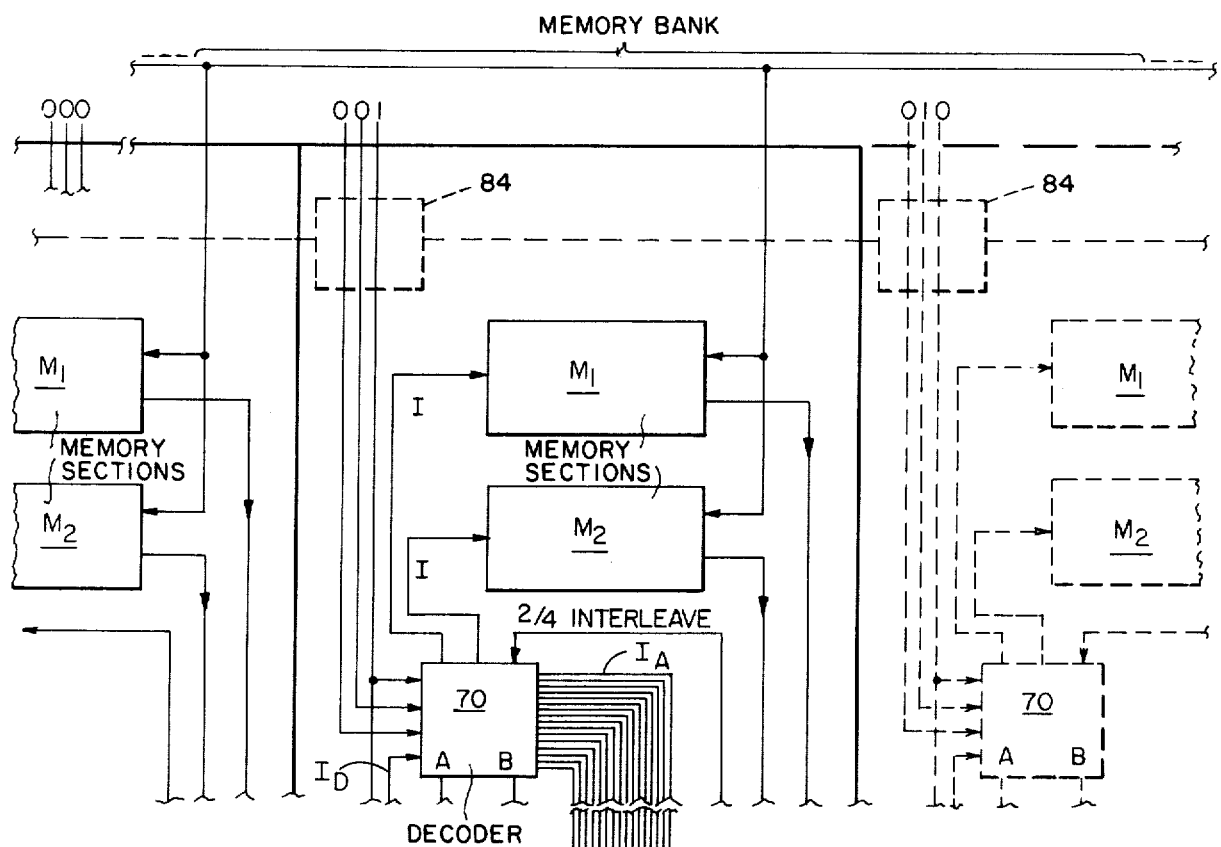
FIG. 7 is a schematic and table illustrating interaction of the memory modules relative to the address lines.
Figure 7:
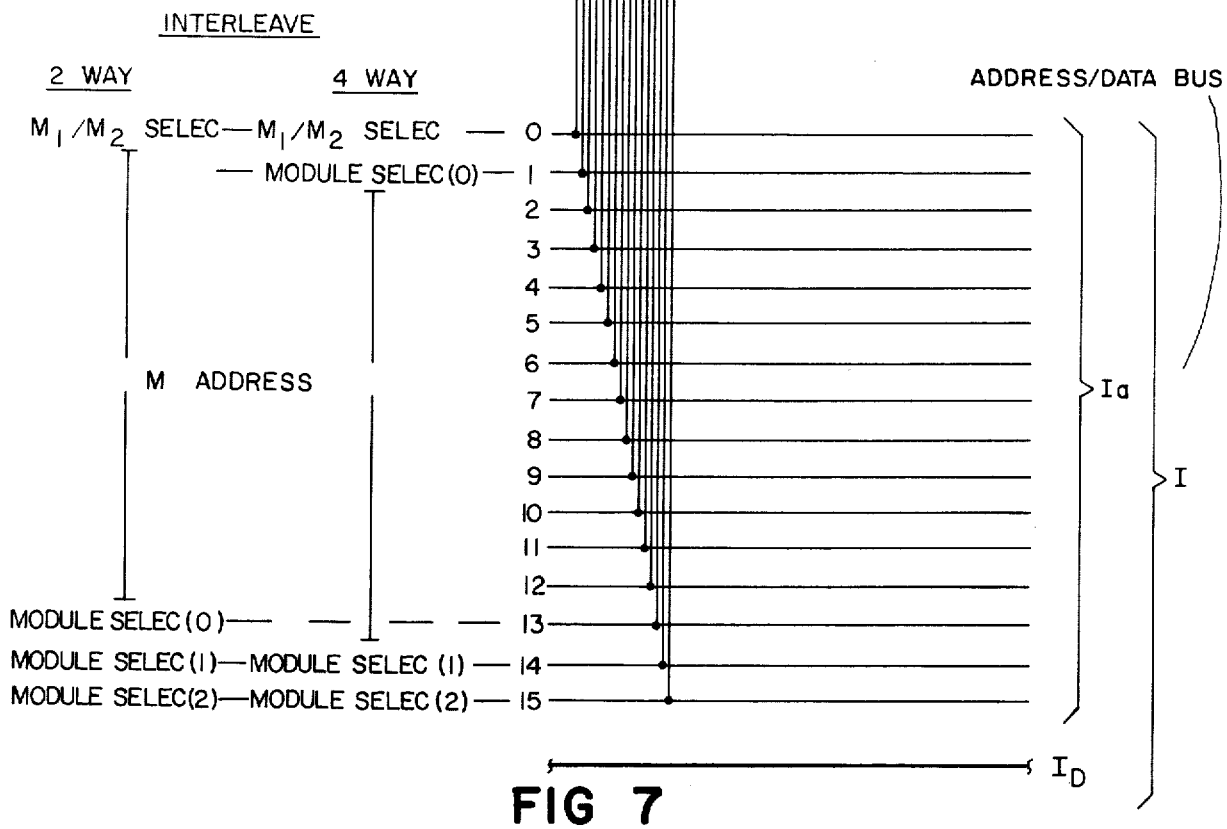
Figure 8:
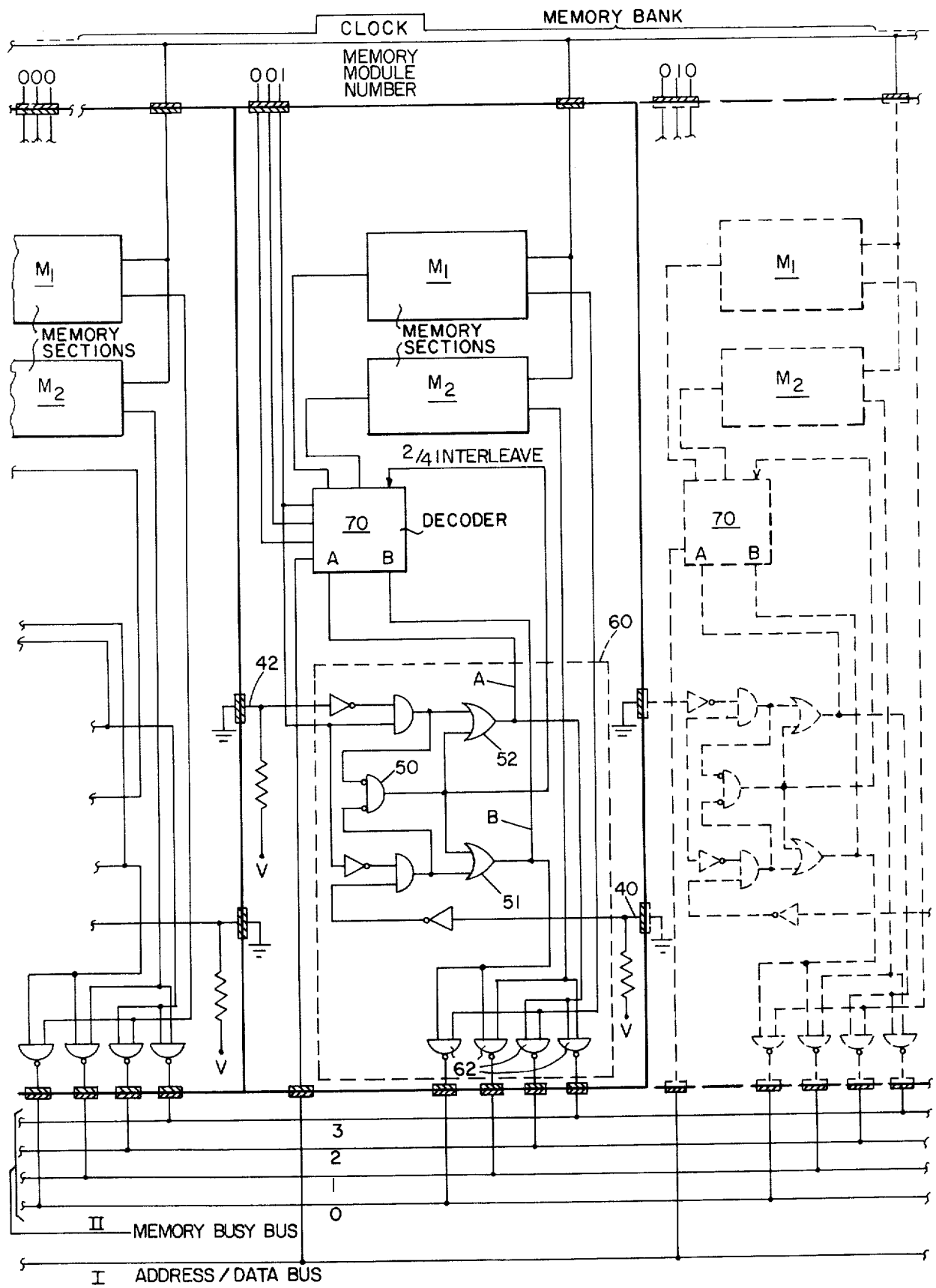
FIG. 8 shows a circuit by which a memory module of FIGS. 6 and 7 responds to the presence of others, and allocates to itself an appropriate section of the address range and memory busy bus.

The foregoing assignments are accomplished on each memory module on the basis of the inputs 40 and 42, employing the logic circuit 60 of FIG. 8 to produce signals A,B which directly enable the NAND gates 62 to appropriately assign the memory busy lines to the memory sections, and which, by input to the address decoder 70, enable the decoder 70 to shift to implement the appropriate line of the table of FIG. 7.

FIG. 8 shows the logic diagram to implement the algorithm for determining whether a 2 or 4-way interleave is to be employed and assignment of the memory busy lines. If the value of the memory module number, modulo 2, equals 0 and signal 40 is logical false, gate 50 indicates 4-way interleave and gate 51 enables memory busy lines 0 and 1. If instead the value of the memory modulo number, modulo 2, equals 1 and signal 42 is logical false, gate 50 indicates 4-way interleave and gate 52 enables memory busy lines 2 and 3. If neither of the above is true then gate 50 indicates a 2-way interleave and gates 51 and 52 are logical true, enabling all four busy lines.

In a more complex embodiment adapted for memory modules of differing capacities, in place of the wired-in memory module numbers for determining address, each module is provided with an adder 84, suggested by dotted lines in FIG. 7, to which is input, by the preceding module, the total memory capacity preceding it, and which outputs, to the succeeding module, that total incremented by the capacity of the respective module. This effectively defines for each module the address range to which it is assigned. Provisions are then made, e.g. on the memory modules themselves, to ensure that the modules mate in appropriate characteristics, e.g. memory size, before they jointly enter into the modulo 4 mode of address interleave.

For more details as to construction and functioning of this data network processor as a data multiplexer, reference is made to my copending U.S. patent application entitled Multiplexer, Ser. No. 775,419, filed Mar. 7, 1977, a continuation of Ser. No. 702,921, filed July 6, 1976 and now abandoned.

What is claimed is:

1. In combination,
a plurality of processors,
a corresponding plurality of logic circuits,
at least one memory device,
a bus connecting each of said processors with said memory device,
a request line from each of said processors to one of said corresponding plurality of logic circuits for making thereover a memory device use request,
a memory status bus connecting said memory device with each of said logic circuits for simultaneous signalling thereto whether said memory device is available,
waiting time measuring means within each of said corresponding plurality of logic circuits for signalling the length of time a respective processor has been waiting,
a waiting time bus for applying to all said logic circuits the longest available processor waiting time,
comparator means in each said logic circuit to compare the waiting time of its respective processor with that on said waiting time bus,
means in each said logic circuit to provide a rank signal different from that in each other logic circuit to break ties, and
means to cause functioning of said logic circuits within coincident periods of time,
each logic circuit being adapted to connect its respective processor to said memory device when there is coincidence of a request for said memory device by said respective processor over a respective request line, an availability signal over said memory bus, and its waiting time line signal is equal to the signal of said waiting time bus and one of greater than any other waiting time line signal or equal to the largest other waiting time line signal and of higher rank signal, whereby no processor can reach said memory device twice before another that interveningly has requested it reaches it once, to minimize maximum waiting time.

2. The combination of claim 1 wherein when a said logic circuit has determined that its processor is ready to be connected to said memory device, it emits a disabling signal to the logic circuits of lower rank, said combination further comprising means connected to said logic circuits for communicating said disabling signal to said logic circuits of lower rank, said means to provide a rank signal including disabling output and disabling input connections for said logic circuits for respectively emitting and receiving said disabling signal, the logic circuit of highest rank having no such disabling input connections, the logic circuit of lowest rank having no such disabling output connection, and the logic circuits of decreasing rank having correspondingly increasing numbers of disabling input connections, corresponding to the logic circuits of higher rank, and means in each said logic circuit for disabling said circuit upon receipt of said disabling signal at a disabling input connection.

3. The combination of claim 2 further comprising means for providing a constant dummy logic value, said value being of opposite sense from that of said disabling signal, said means to provide a rank signal including enabling input connections for said logic circuits for receiving said dummy logic value, the sum of said enabling and disabling input connections for each said logic circuit being equal to said sum for any other logic circuit, the logic circuit of lowest rank thereby having no such enabling input connections, and the logic circuits of increasing rank having correspondingly increasing numbers of enabling input connections.

4. The combination of claim 1 wherein said means to cause functioning of said logic circuits within coincident periods of time is a clock.

5. The combination of claim 1 further including in each said logic circuit means for disabling the respective logic circuit when its said comparator means shows that the waiting time bus signal exceeds its waiting time line signal.

6. The combination of claim 5 wherein each logic circuit includes a shift register, means to maintain said shift register clear during intervals when said logic circuit's corresponding processor is not making a memory device use request, means to accumulate in said shift register a set of consecutive ones corresponding to the number of periods of time said processor has been making said memory device use request, and means to apply during each of said periods of time said set of ones to corresponding inputs to said waiting time bus, whereby the highest order one on said waiting time bus represents the longest waiting time of any processor.

7. The combination of claim 6 wherein said waiting time bus comprises a plurality of waiting time bus lines and each stage of each shift register is respectively connected to one of said waiting time bus lines by means of a first logic device implementing the wired OR function, whereby a logical true in any such stage forces the corresponding value to appear on its respective waiting time bus line regardless of the value of any other input to said waiting time bus line.

8. The combination of claim 7 wherein each said first logic device is an open collector NAND gate having as one input a stage of said shift register and as the other input said memory availability signal from said memory status bus.

9. The combination of claim 8 wherein said comparator means has as a first set of inputs the stages of said shift register and as a second set of inputs the corresponding lines of said waiting time bus and emits an enabling comparison signal when and only when there is identity in the two sets of inputs.

10. The combination of claim 9 including a second logic device in each said logic circuit, said second logic device having a third set of inputs comprising said comparison signal, said memory availability signal, and a set of signals from higher ranked logic circuits representing that no higher ranked circuit is tied, said second logic device emitting a bus grant signal when all the inputs of said third set are enabling.

11. The combination of claim 10 further comprising means for applying said bus grant signal to lower ranked logic circuits for disabling corresponding second logic devices in said lower ranked logic circuits.

12. The combination of claim 1 wherein there are a plurality of memory devices, said bus connecting each of said processors with each of said memory devices is an address/data bus for carrying memory device address request information and data, there are a plurality of lines connecting each processor to said address/data bus, some of said lines carrying memory device address request information and others carrying data, said memory status bus comprises a plurality of lines, and there are means defining the address of each of said memory devices on an interleaved basis modulo n where n is a number equal to or greater than the number of said memory devices, each of said logic circuits has a data selector having as inputs the lines of said memory status bus and selected lines connecting said processor to said address/data bus and carrying memory device address request information, those lines selected being the lowest significant lines of the lines carrying the memory device address requested by the said respective processor to give the modulo n value of the requested address, said data selector producing a memory available enabling signal when said modulo n value corresponds to a memory status bus line giving an availability signal.

13. The combination of claim 12 further comprising a bus grant output device in each said logic circuit and wherein the output of said data selector is connected as an enabling signal to said bus grant output device.

14. The combination of claim 12 wherein each logic circuit includes a waiting time shift register, and a memory device use request signal from said processor, when said processor has a data transfer requirement, is connected as a start signal of said waiting time shift register.

15. The combination of claim 12 further comprising an input-output bus for connection to a multiplicity of real time data ports and connectable via a selected processor to said address/data bus, said logic circuits speeding the processing of data to enable real time operation without interruption.

16. The combination of claim 1 wherein said bus connecting each of said processors with said memory device is an address/data bus, said combination further comprises an input/output bus for connecting said processors to a plurality of data ports, said data ports communicate with said memory device through said processors, said combination is of modular construction, said processors are processor modules, and said modular construction enables change in the number of processor modules to conform said combination to the level of data traffic at the point of use, each said logic circuit determining for its processor module when access can be had to said address/data bus for the purposes of transferring a character of data between a data port and said memory device and performing functions ancillary thereto, and a first wiring system interconnecting said memory device and the processor modules to enable function of said logic circuits, said first wiring system including said memory status bus and said waiting time bus.

17. The combination of claim 16 including means for receiving an additional processor module and a second, priority wiring system automatically connected to an additional processor module by insertion of said module, to provide priority interconnection from said additional processor module to the rest of said processor modules, with disabling input connections from any processor module of higher rank signal and a disabling output connection to any processor module of lower rank signal.

18. The combination of claim 17 wherein said means for receiving comprises a plurality of processor positions into which said processor modules with their respective logic circuits may be inserted, each logic circuit having a set of input connections corresponding to one less than the maximum number of processor modules that can be inserted into said processor positions, said second, priority wiring system applying a permanent enabling value to all of said input connections to the logic circuit of highest rank and descendingly fewer of said input connections for logic circuits of correspondingly descending rank, each logic circuit producing a bus grant signal when it has determined that its processor module is ready to be connected to said memory device, said second, priority wiring system connecting the disabling output connection of each logic circuit to a respective disabling input connection of each logic circuit of lower rank, disabling means in each logic circuit to disable said circuit upon receipt of a said bus grant signal from any logic circuit of higher rank, and when a processor module is absent from its said processor position, said second, priority wiring system applies a permanent enabling value to the lower ranked logic circuits' input connections that were connected to the disabling output connection of the absent processor module whereby insertion or removal of a processor module into or from its processor position automatically enters or removes the processor module from contention for access to said memory device.

19. The combination of claim 18 further comprising means for enabling any additional processor module inserted into a processor position to automatically connect its logic circuit to said waiting time bus.

20. The combination of claim 19 wherein said waiting time bus is automatically connected to receive a waiting time line signal from and deliver the waiting time bus signal to any additional processor module upon insertion of said processor module into a said processor position.

21. The combination of claim 18 further comprising means for enabling any additional processor module inserted into a said processor position to automatically connect its logic circuit to said memory status bus.

22. The combination of claim 16 wherein there are a plurality of memory devices, said memory devices are memory modules, said memory status bus comprises a plurality of memory status bus lines, and said memory modules allocate all of said memory status bus lines among themselves.

23. The combination of claim 22 further comprising wiring means and means on said memory modules engageable therewith for causing each memory module to sense the presence and location of additional memory modules in said combination, and responsive thereto to assign to themselves respective memory status bus lines.

24. The combination of claim 23 further comprising logic devices on each of said memory modules responsive to the presence and location of additional memory modules to automatically assign to themselves a range of addresses.

25. The combination of claim 16 wherein said memory device has two data memory resources, there are four memory status bus lines communicating to said logic circuits, and two of said memory status bus lines are assigned to each memory resource, both signalling busy to the requesting logic circuit when the respective memory resource is busy.

26. The combination of claim 25 wherein said memory device is a memory module, a second said memory module is inserted into said combination, and insertion of said second memory module causes allocation of one memory status bus line associated with each memory resource of the first memory module to a respective resource of the second module, and said memory modules include means for sensing the position of each other and for selecting particular memory status bus lines in accordance with the relative position of said memory modules.

27. The combination of claim 26 wherein said memory modules include means to shift themselves from a modulo 2 interleave address mode of operation when only one memory module is present to a modulo 4 interleave address mode of operation when two memory modules are present, said logic circuits being unaffected thereby.

28. The combination of claim 22 wherein insertion of an additional memory module is effective to connect it to a memory status bus line to which another memory module is assigned, said two memory modules thereby effectively constituting a single independent memory for the function of said logic circuits.

29. The combination of claim 12 wherein said processors are processor modules and further comprising means for enabling any additional processor module inserted in said combination to automatically connect to said memory status bus to enable production of said memory available enabling signal in response to a memory device address requested by said additional processor module.

30. The combination of claim 29 further including means on each of said memory devices for causing each of said devices to sense the presence and location of additional memory devices in said combination, and responsive thereto to assign to itself a respective memory status bus line.

31. The combination of claim 22 wherein each of said memory modules includes means to shift itself from a first to a second address mode of operation in response to the presence of another of said memory modules, said second mode being an interleave mode.

32. The combination of claim 31 wherein each of said memory modules has two data memory resources, each of said memory modules includes means to shift itself from a modulo (2) interleave address mode in which successively addressed data words are allocated to said two memory resources on each of said modules to a modulo (4) interleave mode shared with another of such memory modules, in the manner that in the set of four successive addresses, two are directed to each of said modules.

* * * * *